Patented May 16, 1939

2,158,918

UNITED STATES PATENT OFFICE 2,158,918

PROCESS FOR PRODUCING HUMUS FERTILIZER

Charles Samuel Townsend, Ealing, England, assignor to Wellesley Holdings Limited, London, England, a British company No Drawing. Application August 3, 1937, Serial No. 157,221. In Great Britain August 10, 1936

3 Claims. (Cl. 71—24)

This invention relates to humus fertilizers having a peat base, and it has for its object to provide an improved material of this character containing a required percentage of one or more fertilizing agents organically combined with the activated humus.

A further object of the invention is to provide a process for producing the above fertilizer.

Broadly the present invention consists of an humus fertilizer containing one or more fertilizing agents organically combined therewith which has been produced by adding to peat a predetermined quantity of fish, vegetable, or animal oil or fat with or without bones and/or zone meal, phosphate rock, or lime, and digesting the mixture by fermentation by subjecting the same to the action of thermophile bacteria at such temperatures and for a period which will cause the hydrolizing of the oils and fats and any extracted ossein from the bones and their organic combination with the peat humus and the partial dehydration of the mass.

The digestion or fermentation of the mass is preferably effected by a process which consists in impregnating the matter with anaerobic and aerobic thermophile bacteria either singly or together and causing the same to be acted upon by the bacteria in two stages. Such a process is described in patent application No. 165,977 and according to such process fermentation proceeds in the first stage by anaerobic bacteria by excluding air from the mass and for a period sufficient for the temperature of the mass to rise to over 50° C. to permit the thermophile bacteria to become active and in the second stage by the aerobic thermophile bacteria by causing the mass to be aerated, such second stage being continued for a period sufficient for the temperature to rise until a required optimum temperature for the thermophile bacteria is attained when said temperature is maintained until the material has become sufficiently degraded and dehydrated.

The bacteria may be obtained either as pure cultures, or, as is preferred, by the use of bacterial fluid such as sewage sludge.

The development of acidity to a harmful extent may be prevented by adding to the mass a neutral readily decomposable salt of a weak alkali such as calcium carbonate. This neutralization of acidity is essential to the process as the organisms work best in a medium whose hydrogen ion concentration is slightly below the neutral point, for instance at a pH of 7.5 to 8.0.

In practice it is preferred to use peat as taken from the deposit with the moisture therein and to disintegrate the same before mixing into it the oil and/or fat. The mass or base thus produced is then filled into a digester or chamber which is sealed during the first or anaerobic stage of fermentation and unsealed during the second or aerobic stage, the activity of the bacteria in said second stage being encouraged by circulating air through the mass preferably under slight pressure.

Previous to the sealing of the chamber for the first stage in the process the mass is sprayed with the necessary quantity of bacterial fluid and any liquid which filters through the mass during the first part of the anaerobic stage may be collected in a sump and re-sprayed onto the mass during this stage.

I have found that good results are obtainable if the first stage is allowed to continue for from 6 to 8 days and the second stage for approximately 10 days but these periods must not be taken as being specific as the periods may vary according to conditions.

The proportions of the constituents of the base may be varied to some extent but the following example is taken from an actual test which resulted in the production of a satisfactory product:

| | Tons |
|---|---|
| Peat | 90 |
| Bones | 2½ |
| Lime | 2 |
| Waste or technical fish, vegetable or animal oil or fat | 2 |

As previously mentioned the peat is as taken from the deposit and is disintegrated in a suitable machine before the oil or fat and other constituents are mixed into it.

The bones may be ground down to pass through a sieve having a mesh of 20 to the square inch before being added also the lime to the same state of division.

Whilst the mass is being filled into the digester, which may be a concrete chamber, the same is continually sprayed with sewage sludge to a total of about 2000 gallons. After this spraying has been completed the chamber is closed to permit of the development of the anaerobic bacteria.

It is during the first 24 hours of this anaerobic period that any liquid collecting in the aforesaid sump is re-sprayed onto the same.

During the second or aerobic stage the temperature is permitted to rise to a point of optimum bacterial activity usually from 80° C. to 85° C. and by suitable control such for example as by controlling the rate of escape of the vapours evolved during fermentation, the mass may be maintained at the suitable elevated temperature until de-hydration has proceeded to the extent required, usually until the product has a moisture content of about 15%.

When the period of fermentation is complete the mass is removed from the chamber and cooled by any suitable method. As a result of this treatment it has been found that the fats, oils and ossein extracted from the bones are hydrolized and the excess moisture passes out of the chamber in the form of watery vapour with the circulating air.

If necessary a suitable bacteria nutrient may be added to the mass to encourage the propagation of the bacteria such for example as molasses or sugar beet tailings.

I claim:

1. A process for converting peat into a humus fertilizer, comprising the steps of mixing therewith, a substantially small quantity of oleaginous fertilizer producing substance selected from the following group vegetable oils and animal oils; bone and bone meal or alkaline material, in such an amount as to maintain the mixture slightly alkaline, allowing the same to ferment at a temperature within the range of 20° C. to 85° C. for a period of time sufficient to convert the peat into humus and to cause the oleaginous substance to hydrolize and combine with said humus.

2. A process for converting peat into humus fertilizer, comprising the steps of mixing therewith a substantially small quantity of an oleaginous fertilizer producing substance selected from the following group vegetable oil and animal oil; bone, and alkaline material in such an amount as to maintain the mixture in slightly alkaline condition, inocculating the mixture when confined within a digester with anaerobic and aerobic thermophile bacteria, operating the digester so as to exclude air from the mass and effect partial fermentation by the anaerobic bacterial, and aerating the mass to complete fermentation at a temperature of 82° to 85° C. by the aerobic thermophile bacteria, said fermentation being effected over a period of time sufficient to convert the peat into humus and to cause the oleaginous substance to hydrolize and combine with said humus.

3. A process for converting peat into a humus fertilizer, comprising the steps of macerating the peat, adding to every 90 tons of said macerated peat approximately 2½ tons of bones, 2 tons of lime, 2 tons of an oleaginous fertilizer producing substance selected from the following group, vegetable oil and animal oil, spraying the mixture, when contained within a digester, with approximately 2000 gallons of sewage sludge, and allowing the sprayed mass to ferment for a period and at temperatures sufficient to enable thermophile bacteria to become active and for the peat to be converted into humus and the oleaginous substance to hydrolize and combine with said humus.

CHARLES SAMUEL TOWNSEND.